(12) United States Patent
An et al.

(10) Patent No.: US 11,607,930 B2
(45) Date of Patent: Mar. 21, 2023

(54) VEHICLE DOOR ASSEMBLY

(71) Applicants: HYUNDAI MOTOR COMPANY, Seoul (KR); Kia Corporation, Seoul (KR)

(72) Inventors: Young Min An, Anyang-si (KR); Seong Geun Jin, Gimhae-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 38 days.

(21) Appl. No.: 17/385,179

(22) Filed: Jul. 26, 2021

(65) Prior Publication Data

US 2022/0089004 A1 Mar. 24, 2022

(30) Foreign Application Priority Data

Sep. 24, 2020 (KR) .................... 10-2020-0123941

(51) Int. Cl.
*B60J 5/04* (2006.01)
*B60J 10/78* (2016.01)

(52) U.S. Cl.
CPC ............. *B60J 5/0402* (2013.01); *B60J 10/78* (2016.02)

(58) Field of Classification Search
CPC .......... B60J 5/0402; B60J 10/78; B60J 10/76
See application file for complete search history.

(56) References Cited

U.S. PATENT DOCUMENTS

| 7,425,032 B2 * | 9/2008 | Morikawa | B60J 10/78 296/146.1 |
| 8,151,520 B2 * | 4/2012 | Yamashita | B60J 10/21 49/502 |
| 2010/0154314 A1 * | 6/2010 | Holmes | B60J 5/0402 49/502 |
| 2015/0246597 A1 * | 9/2015 | Koike | B60J 5/0402 49/459 |

FOREIGN PATENT DOCUMENTS

| DE | 4422010 A1 * | 3/1995 | ............... B60J 1/08 |
| DE | 102005016455 A1 * | 10/2006 | ............ B60J 5/0402 |
| JP | H09300979 A * | 11/1997 | ............... B60J 10/30 |
| JP | H11321322 A * | 11/1999 | ............ B60J 5/0402 |
| JP | 2021024321 A * | 2/2021 | |

\* cited by examiner

*Primary Examiner* — Jason S Morrow
(74) *Attorney, Agent, or Firm* — Morgan, Lewis & Bockius LLP (57) ABSTRACT

A vehicle door assembly includes: a door panel; a window frame connected to the door panel; a glass run disposed on the window frame; and a division channel extending from the glass run in a height direction of the vehicle, wherein the glass run has a joint portion to which a top end of the division channel is connected and an extension portion extending from the joint portion toward the door panel, the division channel has a mounting bracket connected to the top end of the divisional channel, and the mounting bracket is connected to the joint portion.

14 Claims, 9 Drawing Sheets

VEHICLE DOOR ASSEMBLY

CROSS-REFERENCE TO RELATED APPLICATION

This application is based on and claims the benefit of priority to Korean Patent Application No. 10-2020-0123941, filed on Sep. 24, 2020, in the Korean Intellectual Property Office, the disclosure of which is incorporated herein in its entirety by reference.

TECHNICAL FIELD

The present disclosure relates to a vehicle door assembly, and more particularly, to a vehicle door assembly which is improved in the assemblability of a division channel by which a movable window and a fixed window are divided.

BACKGROUND

A vehicle door includes a door panel and a window frame connected to the door panel. The window frame and the door panel may define a window opening. A glass run may extend along the window frame, and the glass run may be mounted on an inner periphery of the window frame. A beltline may extend along the door panel, and the beltline may be brought in contact with a movable glass moving in a vertical direction, thereby preventing moisture, foreign objects, and the like from entering the door panel.

The vehicle door may be divided into a frame door and a panel door. The frame door may be defined as a vehicle door in which a roll-formed window frame is assembled to an inner panel of a door panel by welding, using fasteners and/or the like. The panel door may be defined as a vehicle door in which a window frame is integrally molded with an inner panel of a door panel by press molding.

The vehicle door includes a movable window glass and a fixed glass. The movable window glass may move vertically in the window opening, and the fixed glass may be fixedly disposed between the window frame and the door panel. The vehicle door includes a division channel by which the movable window and the fixed window are divided.

In the panel door according to the related art, the division channel may be integrally formed with the glass run through insert molding and/or the like, extend within the window opening, and guide the movement of the window glass within the window opening. A lower channel may be mounted in the door panel, guide the movement of the window glass within the door panel, and be vertically spaced apart from the division channel. Since the division channel and the lower channel are spaced apart from each other, noise and vibration may be severely generated between the division channel and the lower channel when the movable window is moved vertically, resulting in reduced durability.

The related art division channel may include a skin and a core embedded in the skin, and the skin and the core may be made of different materials. Specifically, the core may be made of a plastic material such as polypropylene (PP), and the skin may be made of a material similar to or the same as that of the glass run, such as thermoplastic vulcanizates (TPV). In particular, the skin and the core may be integrally molded through insert molding, which increases the manufacturing cost of the division channel.

According to the related art, since the division channel is connected to the window frame in a lateral direction of the vehicle, an assembly process thereof may be complex. To assemble the division channel and the window frame, a plurality of fasteners may be required, which increases the manufacturing cost of the vehicle door.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a vehicle door assembly capable of reducing manufacturing cost of a division channel and improving assemblability of the division channel.

According to an aspect of the present disclosure, a vehicle door assembly may include: a door panel; a window frame connected to the door panel, and defining a window opening; a glass run disposed on the window frame; a window glass configured to move vertically in the window opening; a fixed glass fixedly disposed between the window frame and the door panel; and a division channel extending from the glass run in a height direction of the vehicle so as to divide the window glass from the fixed glass. The glass run may have a joint portion to which a top end of the division channel is connected, and an extension portion extending from the joint portion toward the door panel. The division channel may have a mounting bracket connected to the top end of the divisional channel, and the mounting bracket may be connected to the joint portion.

The glass run may have an insert embedded in the joint portion, the window frame may be connected to the insert, and the mounting bracket may be connected to the insert.

The mounting bracket may have a first retention barb, the insert may have a second retention barb with which the first retention barb is engaged, and the mounting bracket may extend in the height direction of the vehicle.

The first retention barb may have a first engagement surface extending in a direction perpendicular to the height direction of the vehicle, the second retention barb may have a second engagement surface extending in the direction perpendicular to the height direction of the vehicle, and the first engagement surface may be engaged with the second engagement surface.

The window frame may have a flange protruding toward the glass run, and a locking lance protruding from the flange, and the insert may have a cavity in which the flange of the window frame is received, and a locking recess with which the locking lance is engaged.

The flange and the cavity may extend along a transverse direction of the vehicle.

The locking recess may have an inclined surface which is inclined with respect to a transverse direction of the vehicle, and the locking lance may be inclined with respect to the transverse direction of the vehicle.

The joint portion may have a first stopper hole, the window frame may have a second stopper hole aligned with the first stopper hole, and the insert may have a stopper passing through the first stopper hole and the second stopper hole.

The stopper may have a stopper surface extending in a direction perpendicular to a longitudinal direction of the vehicle.

The division channel may include an upper area located within the window opening and a lower area located within the door panel.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
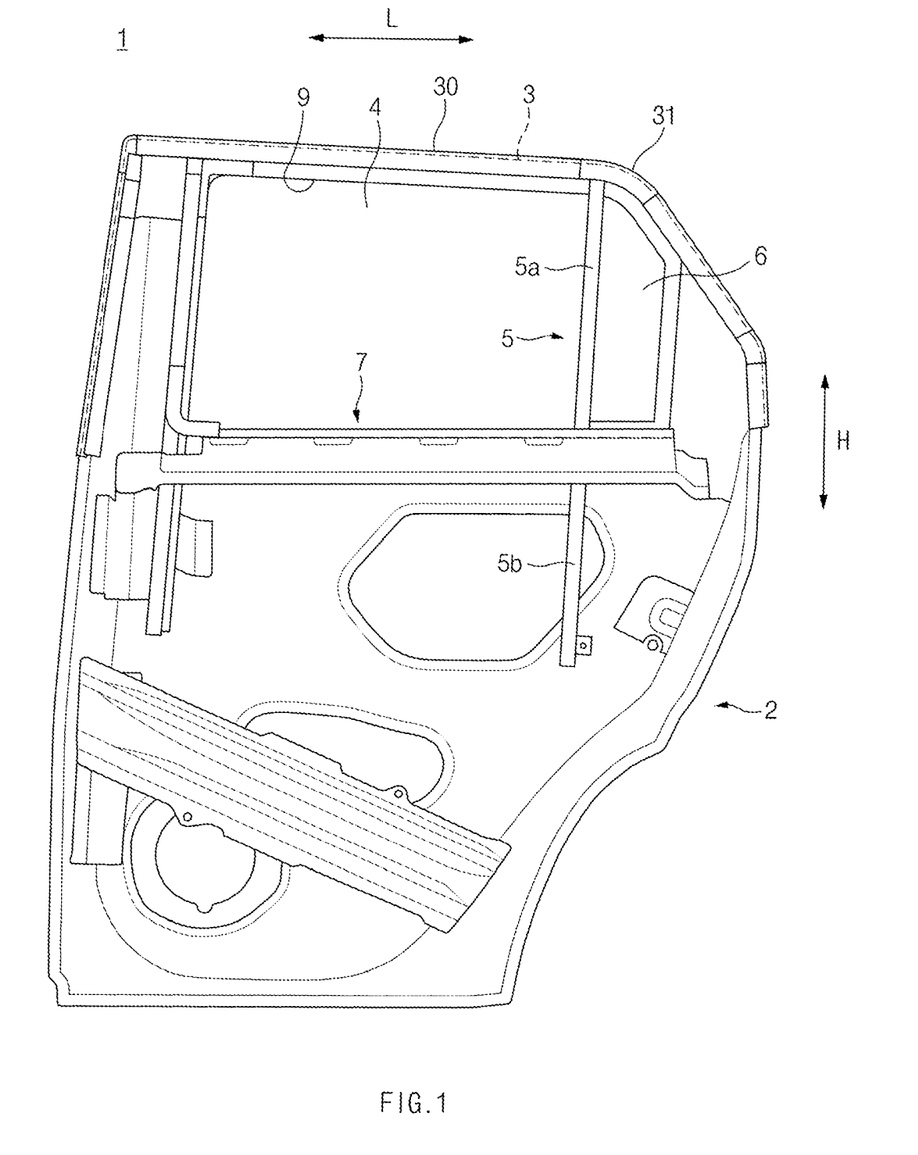
FIG. 1 illustrates a vehicle door assembly according to an exemplary embodiment of the present disclosure.

Referring to FIG. 1, a vehicle door assembly 1 according to an exemplary embodiment of the present disclosure may include a door panel 2, and a window frame 3 connected to the door panel 2.

The window frame 3 and the door panel 2 may define a window opening 9. A glass run 30 may extend along the window frame 3, and the glass run 30 may be mounted on the window frame 3.

The door panel 2 may include an inner panel facing the interior space of the vehicle and an outer panel facing the exterior space of the vehicle. An inner belt seal may be joined to a top end of the inner panel, and an outer belt seal may be joined to a top end of the outer panel. The inner belt seal and the outer belt seal may form a beltline 7. The inner belt seal and the outer belt seal of the beltline 7 may be brought in contact with a movable window glass moving in a vertical direction, thereby preventing moisture, foreign objects, and the like from entering the vehicle door assembly.

The vehicle door assembly 1 may include a movable window glass 4 and a fixed glass 6. The window glass 4 may move vertically in the window opening 9, and the fixed glass 6 may be fixedly disposed between the window frame 3 and the door panel 2.

Referring to FIG. 1, the vehicle door assembly 1 may include a division channel 5 by which the movable window glass and the fixed glass 6 are divided. Specifically, the division channel 5 may be made of a single metal material such as steel through roll forming and/or the like, and thus the division channel 5 may be manufactured at a lower manufacturing cost than a conventional division channel. Thus, the division channel 5 may extend from the window frame 3 to the inside of the door panel 2 for division of the window opening 9. In particular, the division channel 5 may extend in a height direction H of the vehicle, and the division channel 5 may have a channel portion by which a movement of the window glass 4 is guided and a channel portion by which the fixed glass 6 is sealed.

The division channel 5 may include an upper area 5a disposed within the window opening 9 and a lower area 5b disposed within the door panel 2. The upper area 5a of the division channel 5 may guide the movement of the window glass 4 within the window opening 9, and the lower area 5b of the division channel 5 may guide the movement of the window glass 4 within the door panel 2.

Figure 2:
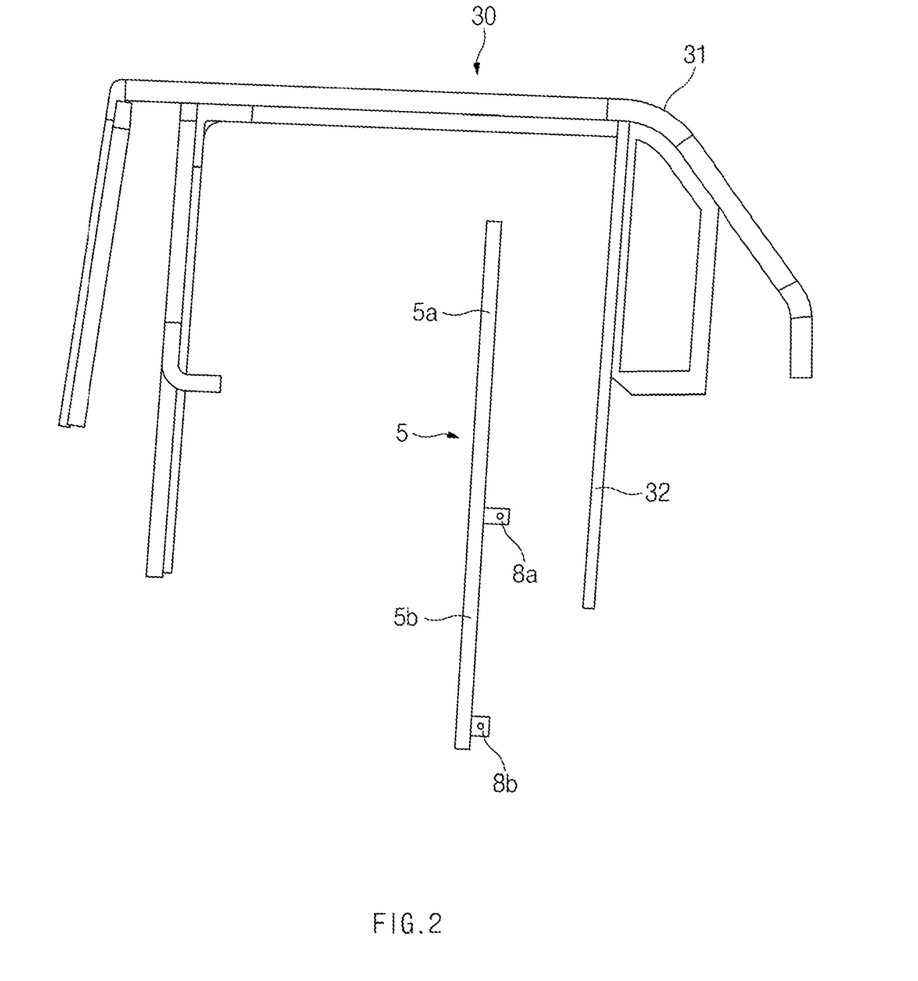
FIG. 2 illustrates a glass run and a division channel mounted on a vehicle door assembly according to an exemplary embodiment of the present disclosure.

Referring to FIGS. 1 and 2, the glass run 30 may extend along the window frame 3, and the glass run 30 may be made of a material such as thermoplastic vulcanizates (TPV). In addition, the glass run 30 may have a joint portion 31 to which a top end of the division channel 5 is connected, and an extension portion 32 extending from the joint portion 31 toward the door panel 2. The joint portion 31 may be connected to a corner portion of the glass run 30 to form a unitary one-piece structure, and the joint portion 31 may be curved to a predetermined radius. The joint portion 31 and the extension portion 32 may be integrally connected to the glass run 30 through insert molding and/or the like so that the joint portion 31, the extension portion 32, and the glass run 30 may form a unitary one-piece structure. The joint portion 31 and the extension portion 32 may be basically made of the same class of material as that of the glass run 30.

Figure 3:
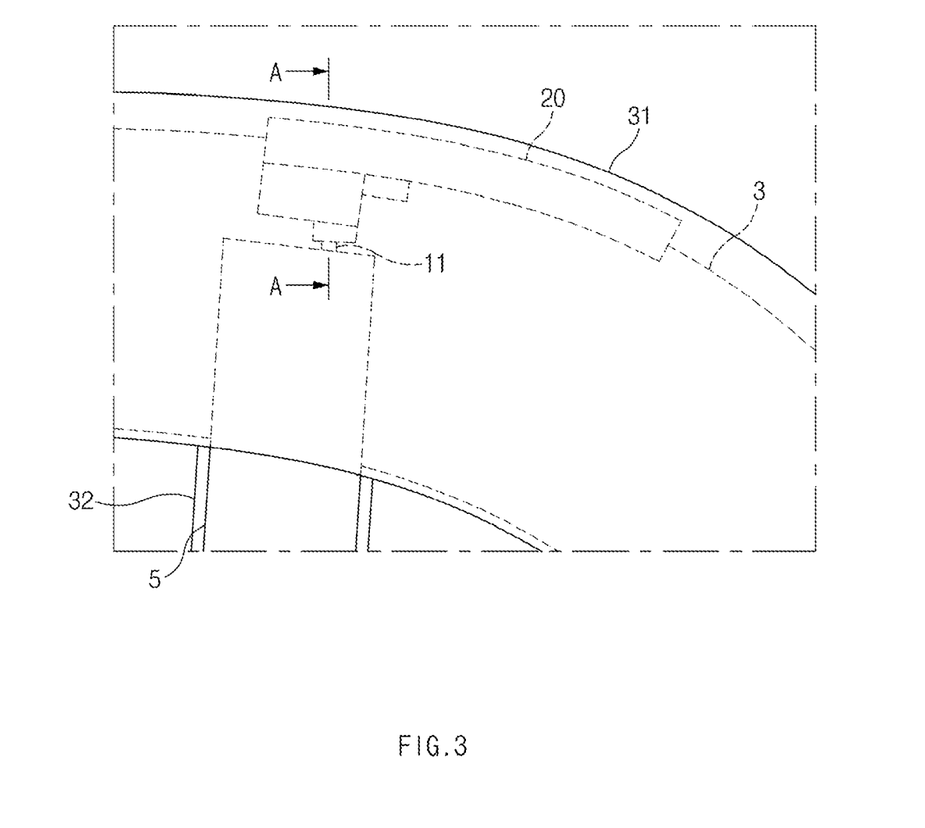
FIG. 3 illustrates a structure in which a top end of a division channel is connected to a joint portion of a glass run in a vehicle door assembly according to an exemplary embodiment of the present disclosure.

Referring to FIG. 3, the glass run 30 may have an insert 20 embedded in the joint portion 31, and the insert 20 may be integrally embedded in the joint portion 31 through insert molding. The insert 20 may have a shape corresponding to that of the joint portion 31, and the insert 20 may extend in a longitudinal direction of the joint portion 31. The joint portion 31 may be made of the same or similar material to that of the glass run 30, such as thermoplastic vulcanizates (TPV), and the insert 20 may be made of a plastic material having a relatively higher strength than the material of the joint portion 31 and/or the material of the glass run 30. For example, the insert 20 may be made of polypropylene. The top end of the division channel 5 may be connected to the insert 20 of the joint portion 31 through a mounting bracket 11. The upper area 5a of the division channel 5 may overlap the extension portion 32 of the glass run 30, and the lower area 5b of the division channel 5 may be mounted on the door panel 2 through brackets 8a and 8b, fasteners, and/or the like.

Figure 4:
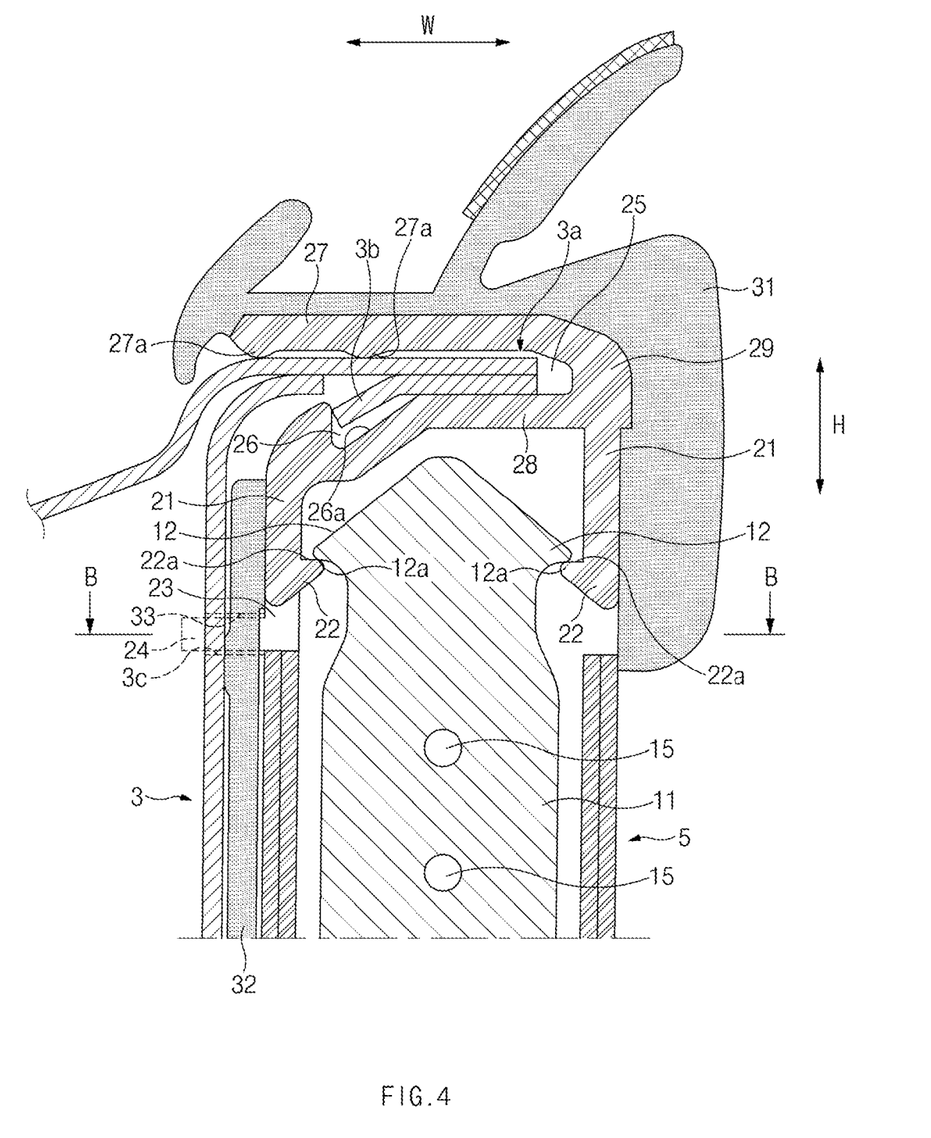
FIG. 4 illustrates a cross-sectional view, taken along line A-A of FIG. 3.
Figure 6:
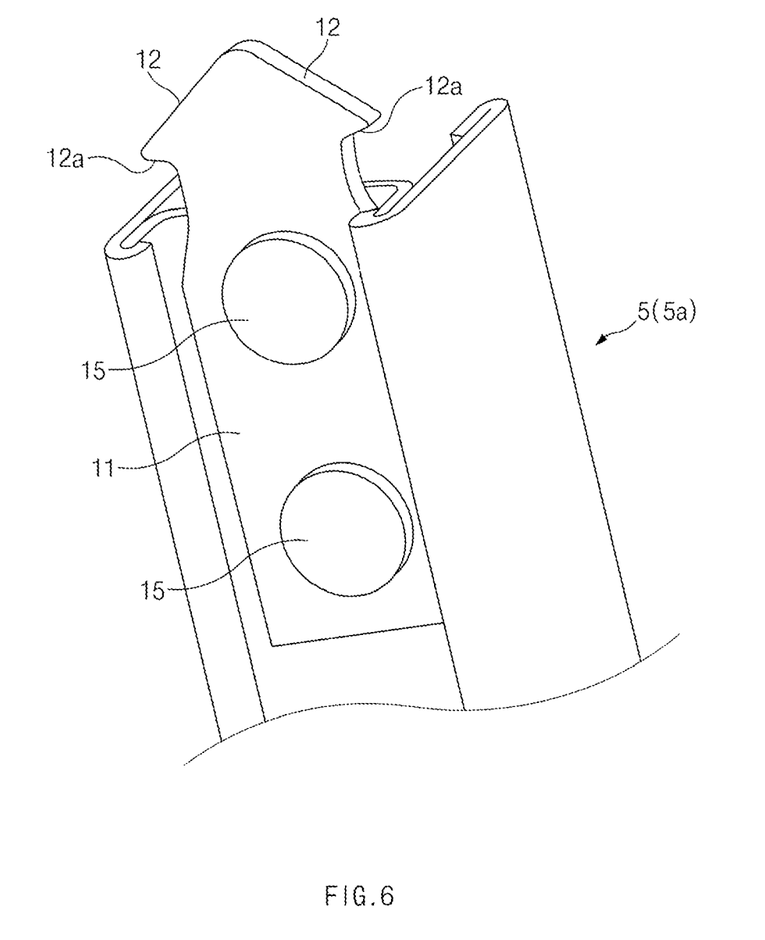
FIG. 6 illustrates a perspective view of a structure in which a mounting bracket is connected to a top end of a division channel in a vehicle door assembly according to an exemplary embodiment of the present disclosure.

Referring to FIGS. 4 and 6, the mounting bracket 11 may be connected to the top end of the division channel 5 by using fasteners, welding 15, and/or the like. The mounting bracket 11 may extend in a longitudinal direction of the division channel 5, and the mounting bracket 11 may extend in the height direction H of the vehicle. The mounting bracket 11 may have a pair of first retention barbs 12 opposing each other. Each first retention barb 12 may have a first engagement surface 12a extending in a direction perpendicular to a longitudinal direction of the mounting bracket 11. That is, the first engagement surface 12a may extend in a direction perpendicular to the height direction H of the vehicle. The pair of first retention barbs 12 may protrude symmetrically with respect to the center of the mounting bracket 11.

Figure 7:
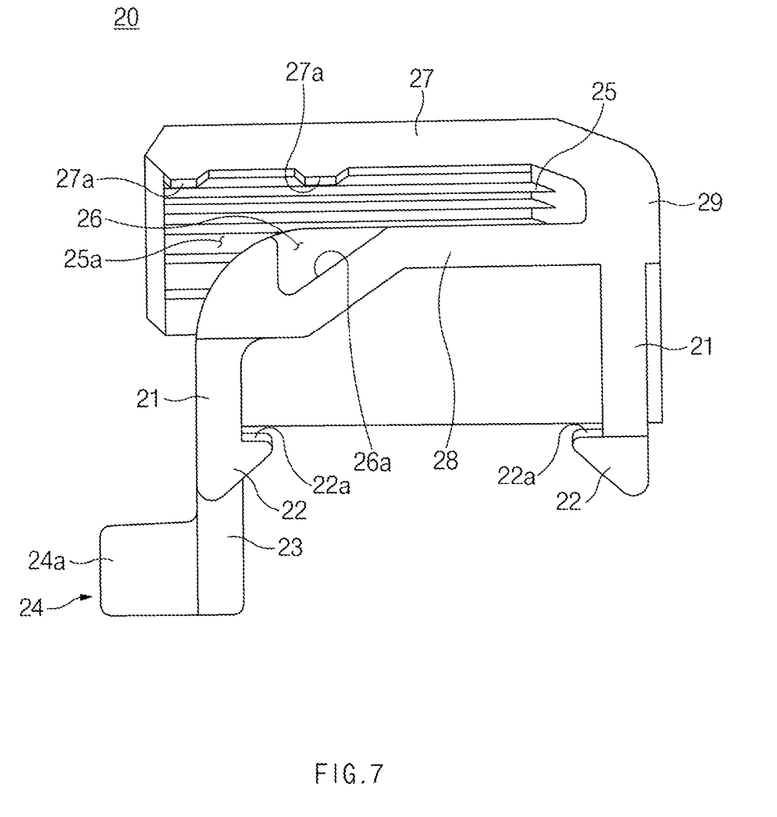
FIG. 7 illustrates a front view of an insert in a vehicle door assembly according to an exemplary embodiment of the present disclosure.

Referring to FIG. 7, the insert 20 may have a pair of retention legs 21 with which the first retention barbs 12 of the mounting bracket 11 are engaged, and the pair of retention legs 21 may extend in the height direction H of the vehicle. Each retention leg 21 may have a second retention barb 22 which may have a second engagement surface 22a perpendicular to a longitudinal direction of the retention leg 21. That is, the second engagement surface 22a may extend in the direction perpendicular to the height direction H of the vehicle. The insert 20 may include a top wall 27, a bottom wall 28 spaced apart from the top wall 27, and a sidewall 29 connecting an edge of the top wall 27 and an edge of the bottom wall 28. The insert 20 may have a cavity 25 defined by the top wall 27, the bottom wall 28, and the sidewall 29. The top wall 27, the bottom wall 28, and the cavity 25 may extend along a transverse direction W of the vehicle, and the pair of retention legs 21 may extend from the bottom wall 28 in the height direction H of the vehicle. The cavity 25 may have an opening 25a facing the sidewall 29, and the top wall 27 may have at least one projection 27a protruding toward the bottom wall 28. The insert 20 may have a locking recess 26 communicating with the cavity 25, and the locking recess 26 may be provided in the bottom wall 28. The locking recess 26 may have an inclined surface 26a which is inclined with respect to the transverse direction W of the vehicle. That is, the inclined surface 26a may be inclined with respect to an axis of the cavity 25.

Figure 8:
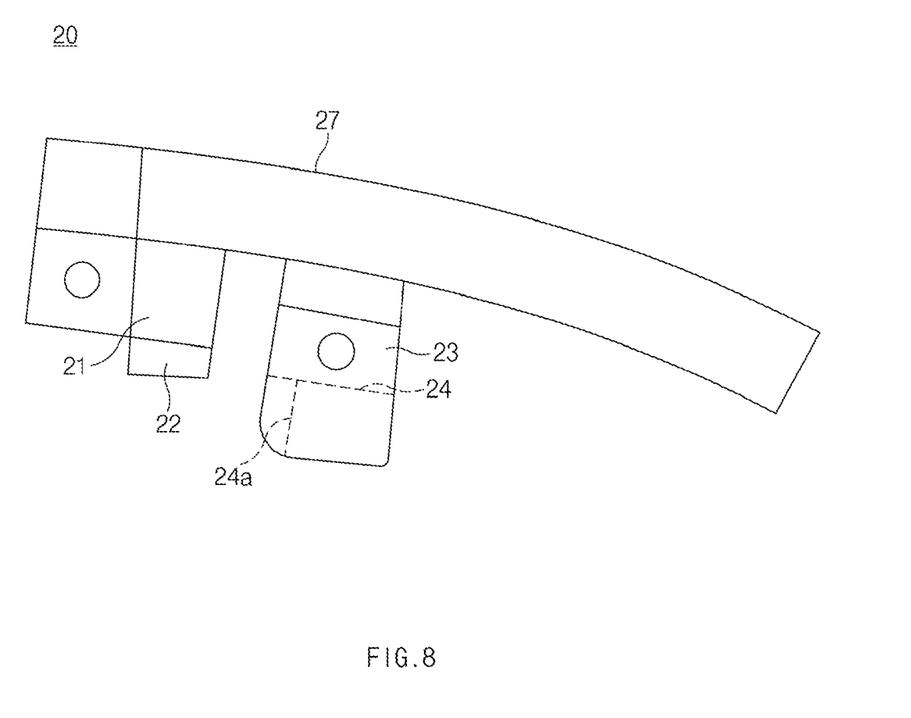
FIG. 8 illustrates a side view of an insert in a vehicle door assembly according to an exemplary embodiment of the present disclosure.
Figure 9:
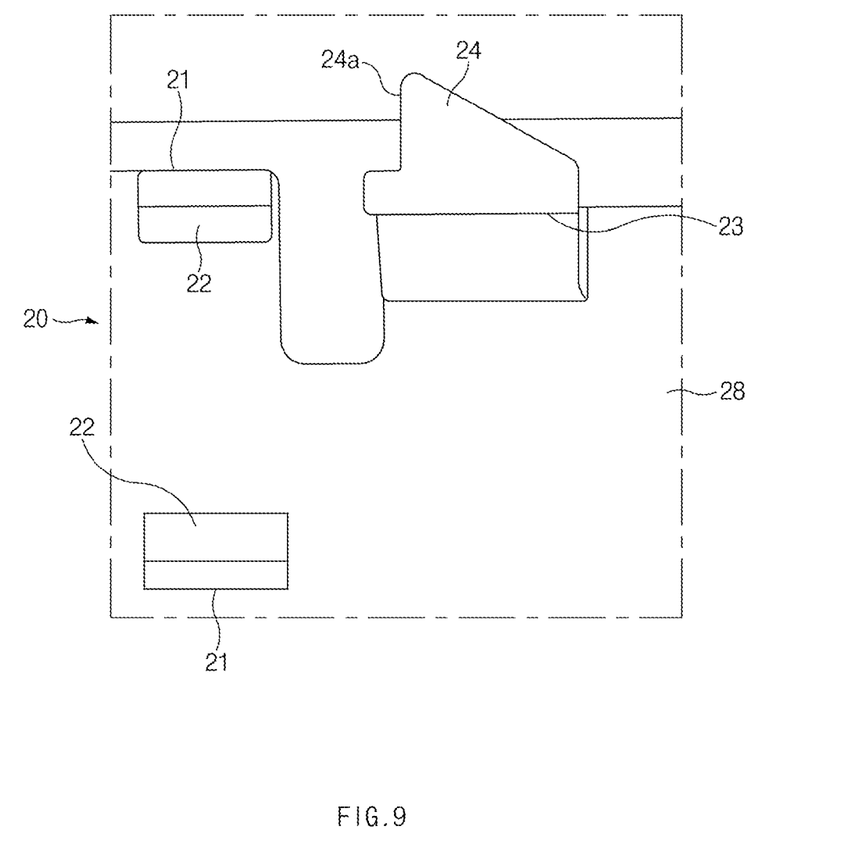
FIG. 9 illustrates a bottom view of an insert in a vehicle door assembly according to an exemplary embodiment of the present disclosure.

Referring to FIGS. 7 to 9, the insert 20 may have a support wall 23 vertically extending from the bottom wall 28. The support wall 23 may be spaced apart from any one retention leg 21, and the support wall 23 may be adjacent to the window frame 3. Referring to FIG. 4, a bottom end surface of the support wall 23 may contact or be adjacent to the top end of the division channel 5. A stopper 24 may protrude from the support wall 23 toward the window frame 3. The stopper 24 may extend in a longitudinal direction L of the vehicle. The stopper 24 may have a stopper surface 24a, and the stopper surface 24a may extend in a direction perpendicular to the longitudinal direction L of the vehicle. That is, the stopper surface 24a may extend along the transverse direction W of the vehicle.

Referring to FIG. 4, the window frame 3 may have a flange 3a protruding toward the glass run 30, and a locking lance 3b protruding from a bottom surface of the flange 3a toward the insert 20. The flange 3a may extend from a top edge of the window frame 3 along the transverse direction W of the vehicle, and the locking lance 3b may be inclined with respect to the transverse direction W of the vehicle. That is, the locking lance 3b may be inclined with respect to the transverse direction W of the vehicle and an axis of the flange 3a.

Referring to FIG. 4, the flange 3a of the window frame 3 may be received in the cavity 25 of the insert 20, and the locking lance 3b of the window frame 3 may be engaged with the locking recess 26 of the insert 20 so that the insert 20 may be joined to the window frame 3 along the transverse direction W of the vehicle. Therefore, the mounting bracket 11 of the division channel 5 and the insert 20 may be restricted in the transverse direction W of the vehicle. In addition, when the flange 3a of the window frame 3 is fully received in the cavity 25 of the insert 20, the projection 27a of the top wall 27 may push the flange 3a of the window frame 3 so that the locking lance 3b of the window frame 3 may be firmly engaged with the locking recess 26 of the insert 20. As the locking lance 3b of the window frame 3 is engaged with the locking recess 26 of the insert 20, the insert 20 and the window frame 3 may be restricted in the transverse direction W of the vehicle.

Referring to FIG. 4, the first engagement surface 12a of each first retention barb 12 of the mounting bracket 11 may be engaged with the second engagement surface 22a of the corresponding second retention barb 22 so that the mounting bracket 11 may be connected to the insert 20 of the joint portion 31 in the height direction H of the vehicle. That is, the mounting bracket 11 of the division channel 5 and the insert 20 may be restricted by the first retention barbs 12 and the second retention barbs 22 in the height direction H of the vehicle.

Figure 5:
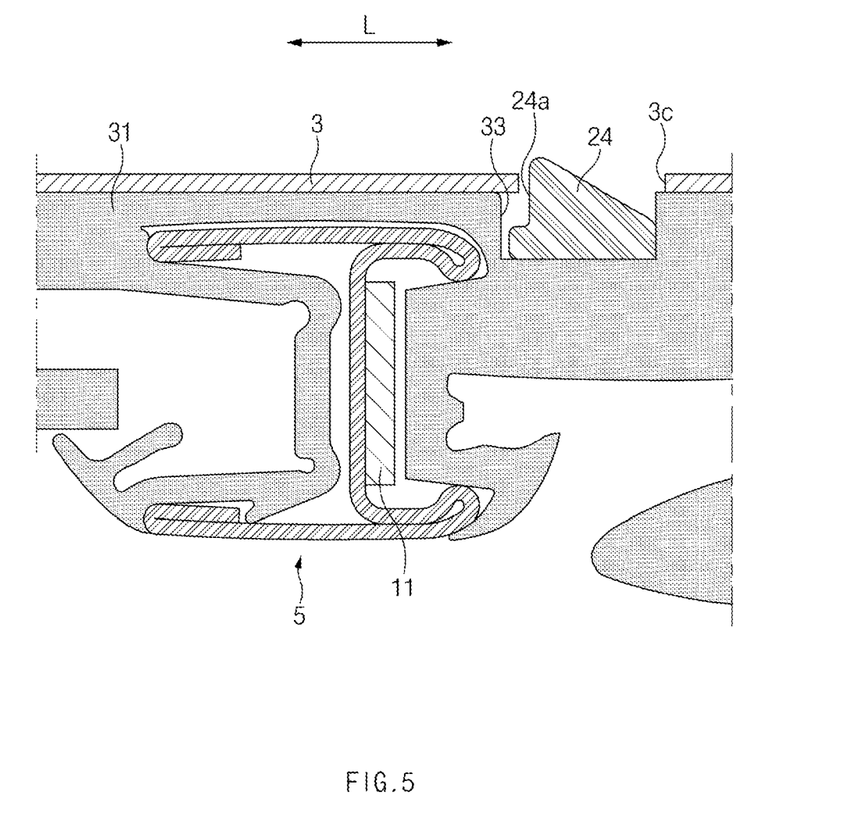
FIG. 5 illustrates a cross-sectional view, taken along line B-B of FIG. 4.

Referring to FIG. 5, the joint portion 31 of the glass run 30 may have a first stopper hole 33 through which the stopper 24 of the insert 20 passes, and the window frame 3 may have a second stopper hole 3c aligned with the first stopper hole 33. The stopper 24 may pass through the first stopper hole 33 of the joint portion 31 and the second stopper hole 3c of the window frame 3. As the stopper surface 24a of the stopper 24 is supported to the second stopper hole 3c of the window frame 3, the mounting bracket 11 of the division channel and the insert 20 may be restricted in the longitudinal direction L of the vehicle.

FIGS. 1 to 9 illustrate the vehicle door assembly 1 which is applied to a rear door, but the vehicle door assembly according to an exemplary embodiment of the present disclosure may be applied to a front door.

According to an exemplary embodiment of the present disclosure, as the locking lance 3b of the window frame 3 is engaged with the locking recess 26 of the insert 20, the insert 20 and the window frame 3 may be restricted in the transverse direction W of the vehicle, and thus the division channel 5 connected to the insert 20 may be restricted in the transverse direction W of the vehicle. The mounting bracket 11 of the division channel 5 and the insert 20 may be restricted by the first retention barbs 12 and the second retention barbs 22 in the height direction H of the vehicle, and thus the division channel 5 may be prevented from hanging down loosely. As the stopper surface 24a of the stopper 24 of the insert 20 contacts the second stopper hole 3c of the window frame 3 or is supported to the second stopper hole 3c of the window frame 3, the mounting bracket 11 of the division channel 5 and the insert 20 may be restricted in the longitudinal direction L of the vehicle, and thus the division channel 5 may be restricted in the longitudinal direction L of the vehicle.

As set forth above, according to exemplary embodiments of the present disclosure, the division channel 5 may be restricted by the insert 20 and the window frame 3 in the transverse direction W, height direction H, and longitudinal direction L of the vehicle. Thus, errors in manufacturing and assembly processes of the vehicle door assembly may be reduced, and matching quality of the vehicle door components may be improved. In addition, NVH performance may be improved by reducing gaps between the vehicle door components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle door assembly, comprising:
    a door panel;
    a window frame connected to the door panel, and defining a window opening;
    a glass run disposed on the window frame;
    a window glass configured to move vertically in the window opening;
    a fixed glass fixedly disposed between the window frame and the door panel; and
    a division channel extending from the glass run in a height direction of the vehicle so as to divide the window glass from the fixed glass,
    wherein the glass run has a joint portion to which a top end of the division channel is connected, and an extension portion extending from the joint portion toward the door panel,
    wherein the division channel has a mounting bracket connected to the top end of the division channel, and
    wherein the mounting bracket is connected to the joint portion.

2. The vehicle door assembly according to claim 1, wherein the glass run has an insert embedded in the joint portion,
    wherein the window frame is connected to the insert, and
    wherein the mounting bracket is connected to the insert.

3. The vehicle door assembly according to claim 2, wherein the mounting bracket has a first retention barb,
    wherein the insert has a second retention barb with which the first retention barb is engaged, and
    wherein the mounting bracket extends in the height direction of the vehicle.

4. The vehicle door assembly according to claim 3, wherein the first retention barb has a first engagement surface extending in a direction perpendicular to the height direction of the vehicle,
    wherein the second retention barb has a second engagement surface extending in the direction perpendicular to the height direction of the vehicle, and
    wherein the first engagement surface is engaged with the second engagement surface.

5. The vehicle door assembly according to claim 2, wherein the window frame has:
    a flange protruding toward the glass run; and
    a locking lance protruding from the flange, and
    wherein the insert has:
        a cavity in which the flange of the window frame is received; and
        a locking recess with which the locking lance is engaged.

6. The vehicle door assembly according to claim 5, wherein the flange and the cavity extend in a transverse direction of the vehicle.

7. The vehicle door assembly according to claim 5, wherein the locking recess has an inclined surface which is inclined with respect to a transverse direction of the vehicle, and
    wherein the locking lance is inclined with respect to the transverse direction of the vehicle.

8. The vehicle door assembly according to claim 2, wherein the joint portion has a first stopper hole,
    wherein the window frame has a second stopper hole aligned with the first stopper hole, and
    wherein the insert has a stopper passing through the first stopper hole and the second stopper hole.

9. The vehicle door assembly according to claim 8, wherein the stopper has a stopper surface extending in a direction perpendicular to a longitudinal direction of the vehicle.

10. The vehicle door assembly according to claim 1, wherein the division channel includes an upper area located within the window opening and a lower area located within the door panel.

11. The vehicle door assembly according to claim 10, wherein the upper area and the lower area of the divisional channel are configured to guide a movement of the window glass within the window opening and the door panel.

12. The vehicle door assembly according to claim 10, wherein the upper area of the divisional channel is configured to overlap the extension portion of the glass run, and
    wherein the lower area of the divisional channel is disposed on the door panel.

13. The vehicle door assembly according to claim 7, wherein the cavity has an opening facing a sidewall of the insert,
    wherein the locking recess is disposed in a bottom wall of the insert and communicates with the cavity,
    wherein the inclined surface of the locking recess is inclined with respect to an axis of the cavity.

14. The vehicle door assembly according to claim 5, wherein the insert further includes at least one projection on a top wall of the insert,
    wherein, when the flange of the window frame is fully disposed in the cavity of the insert, the at least one projection is configured to push the flange of the window frame so that the locking lance of the window frame is engaged with the locking recess of the insert.

\* \* \* \* \*